Patented June 24, 1930

1,766,112

UNITED STATES PATENT OFFICE

MELVIN DE GROOTE, OF ST. LOUIS, AND LOUIS T. MONSON, OF MAPLEWOOD, MISSOURI, ASSIGNORS TO WM. S. BARNICKEL & COMPANY, OF WEBSTER GROVES, MISSOURI, A CORPORATION OF MISSOURI

PROCESS FOR BREAKING PETROLEUM EMULSIONS

No Drawing.   Application filed January 21, 1929.   Serial No. 334,116.

This invention relates to the treatment of emulsions of mineral oil and water, such as petroleum emulsions, for the purpose of separating the oil from the water.

Petroleum emulsions are of the water-in-oil type and comprise fine droplets of naturally-occurring waters or brines, dispersed in a more or less permanent state throughout the oil which constitutes the continuous phase of the emulsion. They are obtained from producing wells, and from the bottoms of oil storage tanks, and are commonly referred to as "cut oil", "roily oil", "emulsified oil", and "bottom settlings".

The object of our invention is to provide a novel and inexpensive process for separating emulsions of the character referred to into their component parts of oil and water or brine.

Briefly described, our process consists in subjecting a petroleum emulsion of the water-in-oil type to the action of a treating agent or demulsifying agent of the kind hereinafter described, thereby causing the emulsion to break down and separate into its component parts of oil and water or brine, when the emulsion is permitted to remain in a quiescent state after treatment.

The treating agent employed in our process consists of a petroleum sulfonic body derived from the condensation of a petroleum body, characterized by being capable of reaction with sulfuric acid, and a polyhydric alcohol residue. It is derived by the action of a condensing and sulfonating agent on a petroleum body of the kind hereinafter described, and a polyhydric alcohol having fewer than twelve carbon atoms. In manufacturing or producing said treating agent, we do not contemplate using all kinds of petroleum bodies. On the contrary, we use only those petroleum bodies that are capable of being united with sulfuric acid to give chemical compounds, such as acid sulfates or sulfonic acids. We will define our treating agent or demulsifying agent more in detail by stating that it is a sulfonic petroleum condensation product derived from a petroleum body, characterized by being chemically reactive towards sulfuric acid, and a polyhydric alcohol having fewer than twelve carbon atoms. As a petroleum body, we can employ any raw or purified oil which is capable of reaction with sulfuric acid to form a sulfate or sulfonate. Likewise, we can employ any material which is already a sulfonic acid or a petroleum acid sulfate. A suitable material is a petroleum sulfonic acid, such as is obtained by the action of sulfuric acid or oleum on crude petroleum or its fractions, or on material obtained by pyrolytic action, such as liquid material obtained from cracking stills. Another suitable material is the petroleum body obtained by extraction of raw petroleum or other fractions with liquid sulfur dioxide. A desirable raw material may be obtained by partial oxidation of selected petroleum bodies. A carboxylic material of the designated specification is also satisfactory. Another suitable material is residual oil obtained from cracking stills, which is in essence a mixture of high boiling cyclic bodies somewhat similar to aromatic bodies. Briefly then, the petroleum body employed may be a crude oil or a fraction thereof or a material derived from a cracking process, and is adaptable to our purpose, provided it is a sulfonic acid body, or capable of entering into reaction with sulfuric acid to give a sulfonic acid or acid sulfate.

The polyhydric alcohol employed in the manufacture or production of our treating agent is an aliphatic alcohol, such as ethylene glycol, propylene glycol, or glycerol, the term "polyhydric alcohol" being herein used to designate organic materials containing two or more hydroxyl groups in the molecule and characterized further in that they form aliphatic hydrogen sulfates with strong sulfuric acid.

The general method used to produce the treating agent is to mix a selected petroleum body and a polyhydric alcohol body in predetermined ratios, such as molecular proportions, and subject the mixture to the action of a condensing agent and a sulfonating agent, such as sulfuric acid. Obviously, if the petroleum body is a petroleum sulfonic acid, it is only necessary to obtain condensation, inasmuch as the sulfonic acid radical is already present. It is possible to introduce two or more polyhydric alcohol residues into the petroleum body. The polyhydric alcohol residues may be the same or they may be different; for instance, one may be an ethylene glycol residue, and the other a glycerol residue. The reaction is generally produced in the presence of an excess of sulfuric acid at an elevated temperature. Usually, a large excess of sulfuric acid is preferable, and sometimes oleum or chloro-sulfonic acid may be employed. Sometimes the reaction is accelerated by the presence of a phosphorus body, such as phosphoric acid, phosphorus pentoxide, or phosphorus oxychloride, or such material as aluminum chloride, zinc chloride, or iron powder. Obviously, in a reaction of the kind described more than one sulfonic group can be introduced into the petroleum body. In addition to the polyhydric alcohol residue, a ketone residue or an aldehyde residue, or monohydric alcohol residue, or fatty residue may also be introduced into the petroleum body.

The procedure that we prefer to use in producing the treating agent or demulsifying agent contemplated by our process is as follows: Four moles of ethylene glycol are mixed with one mole of a petroleum body and agitated vigorously. The temperature is allowed to rise and excess acid is added until condensation is complete. At times, it may be necessary to add a small amount of oleum or chloro-sulfonic acid to complete the final condensation. Sometimes, a suitable catalyst such as a phosphorus compound is added to promote the reaction. When the reaction is complete, the mass is diluted with water until an upper layer separates. The upper layer is drawn off and neutralized with any suitable base, such as caustic soda, caustic potash, or ammonia. We prefer to use ammonia.

Our broad idea contemplates the use of a treating agent having the general characteristics pointed out, produced in various ways. The treating agent that we prefer to employ, however, is one that produces an insoluble preciptate with a soluble alkaline earth salt. The presence or absence of such precipitate probably depends on the number of sulfonic groups introduced into the petroleum body. Therefore, it is our preference that the reaction be carried on so that product of the reaction will show insolubility with alkaline earth salts by a suitable test, such as the following: A 1% solution of the reagent is mixed with a 1% solution of magnesium sulfate and heated for 10 to 30 minutes in a water bath just below the boiling point of water, if required. In the test with either the calcium salt or the magnesium salt, a precipitate should be obtained which remains after the mixture is diluted with two times its volume of distilled water.

A material or substance of the kind above described can be employed as an acid mass to treat a petroleum emulsion, but this is not desirable, due to its corrosive effect. There is no objection to an excess of alkali, if desired. Such material can also be converted into an ester by esterification in the usual manner to produce an aromatic or aliphthatic ester, such as the ethyl ester. Some of the esters so produced may be oil-soluble, such as the hexyl ester. The treating agent, when it is ready for use, may be acidic in nature, and the complex substituted petroleum sulfonic group may be united with an acid hydrogen ion, as is the case when the acid itself is employed. When said acidic material is neutralized, the hydrogen ion is replaced by a suitable metallic ion equivalent, such as a true metallic ion or an ammonium radical. In the event that the material is esterified, the hydrogen ion is replaced by an organic radical, such as an ethyl radical. We will refer to the hydrogen ion or its metallic substitute, or its organic substitute as the hydrogen ion equivalent.

The form, state or condition of the treating agent at the time it is mixed with or applied to the petroleum emulsion to be treated, may be varied to suit existing conditions. It can be used in a substantially anhydrous state or in solutions of any convenient strength. A concentrated solution can be emulsified into oil by agency of any suitable oil-soluble emulsifier, such as calcium oleate. The treating agent can be formed entirely from a material of the kind previously described, or it can be formed from such a material in combination with other well-known treating agents for petroleum emulsions of the water-in-oil type, such as water softeners, modified fatty bodies, or their soaps, petroleum sulfonic acids or their soaps, or other substances having similar properties.

In practising our process a treating agent or demulsifying agent of the kind above described may be brought in contact with the emulsion to be treated in any of the numerous ways now employed in the treatment of petroleum emulsions of the water-in-oil type with chemical demulsifying agents, such, for example, as by introducing the treating agent into the well in which the emulsion is produced; introducing the treating agent into a conduit through which the emulsion is flowing; introducing the treating agent into a tank in which the emulsion is stored, or introducing the treating agent into a container that holds a sludge obtained from the bottom of an old storage tank. In some instances, it may be advisable to introduce the treating agent into a producing well in such a way that it will become mixed with water and oil that are merging from the surrounding strata, before said water and oil enter the barrel of the well pump or the tubing up through which said water and oil flow to the surface of the ground. After treatment the emulsion is allowed to stand in a quiescent state, usually in a settling tank, at a temperature varying from atmospheric temperature to about 200° F., so as to permit the water or brine to separate from the oil, it being preferable to keep the temperature low enough so as to prevent the valuable constituents of the oil from volatilizing. If desired, the treated emulsion may be acted upon by one or the other of various kinds of apparatus now used in the operation of breaking petroleum emulsions, such as homogenizers, hay tanks, gun barrels, filters, centrifuges or electrical dehydrators.

The amount of treating agent on the anhydrous basis that is required to break the emulsion may vary from approximately 1 part of treating agent to 500 parts of emulsion, up to a ratio of 1 part of treating agent to 20,000 parts of emulsion, depending upon the type or kind of emulsion being treated. In treating exceptionally refractory emulsions of the kind commonly referred to as "tank bottoms" or "residual pit oils," the minimum ratio above referred to is often necessary, but in treating fresh emulsions, i. e., emulsions that will yield readily to the action of chemical demulsifying agents, the maximum ratio above mentioned will frequently produce highly satisfactory results. For the average petroleum emulsion of the water-in-oil type a ratio of 1 part of treating agent to 5,000 parts of emulsion will usually be found to produce commercially satisfactory results.

Having thus described our invention, what we claim as new and desire to secure by Letters Patent of the United States is:

1. A process for breaking a petroleum emulsion of the water-in-oil type which consists in subjecting the emulsion to the action of a demulsifying agent containing a petroleum sulfonic body derived from the condensation of a petroleum body, characterized by being capable of reaction with sulfuric acid, and a polyhydric alcohol having fewer than twelve carbon atoms.

2. A process for breaking a petroleum emulsion of the water-in-oil type, which consists in subjecting the emulsion to the action of a water-soluble demulsifying agent containing a petroleum sulfonic body derived from the condensation of a petroleum body, characterized by being capable of reaction with sulfuric acid, and a polyhydric residue having fewer than twelve carbon atoms.

3. A process for breaking a petroleum emulsion of the water-in-oil type, which consists in subjecting the emulsion to the action of a water-soluble demulsifying agent containing a water-soluble salt of a petroleum sulfonic body derived from the condensation of a petroleum body, characterized by being capable of reaction with sulfuric acid, and a polyhydric alcohol residue having fewer than twelve carbon atoms.

4. A process for breaking a petroleum emulsion of the water-in-oil type, which consists in subjecting the emulsion to the action of a water-soluble demulsifying agent containing an ammonium salt of a petroleum sulfonic body derived from the condensation of a petroleum body, characterized by being capable of reaction with sulfuric acid, and a polyhydric alcohol residue having fewer than twelve carbon atoms.

5. A process for breaking a petroleum emulsion of the water-in-oil type, which consists in subjecting the emulsion to the action of a demulsifying agent containing a petroleum sulfonic body derived from the condensation of a petroleum body, characterized by being capable of reaction with sulfuric acid, and an aliphatic polyhydric alcohol having fewer than twelve carbon atoms.

6. A process for breaking a petroleum emulsion of the water-in-oil type, which consists in subjecting the emulsion to the action of a water-soluble demulsifying agent containing a petroleum sulfonic body derived from the condensation of a petroleum body, characterized by being capable of reaction with sulfuric acid, and an aliphatic polyhydric alcohol having fewer than twelve carbon atoms.

7. A process for breaking a petroleum emulsion of the water-in-oil type, which consists in subjecting the emulsion to the action of a water-soluble demulsifying agent containing a water-soluble salt of a petroleum sulfonic body derived from the condensation of a petroleum body, characterized by being capable of reaction with sulfuric acid, and an aliphatic polyhydric alcohol having fewer than twelve carbon atoms.

8. A process for breaking a petroleum emulsion of the water-in-oil type, which consists in subjecting the emulsion to the action of a water-soluble demulsifying agent containing an ammonium salt of a petroleum sulfonic body derived from the condensation of a petroleum body characterized by being capable of reaction with sulfuric acid, and an aliphatic polyhydric alcohol having fewer than twelve carbon atoms.

9. A process for breaking a petroleum emulsion of the water-in-oil type, which consists in subjecting the emulsion to the action of a demulsifying agent containing a petroleum sulfonic body derived from the condensation of a petroleum body, characterized by being capable of reaction with sulfuric acid, and an aliphatic polyhydric alcohol having fewer than twelve carbon atoms, and furthermore, characterized by producing a precipitate with an alkaline earth salt.

10. A process for breaking a petroleum emulsion of the water-in-oil type, which consists in subjecting the emulsion to the action of a water-soluble demulsifying agent containing a petroleum sulfonic body derived from the condensation of a petroleum body, characterized by being capable of reaction with sulfuric acid, and an aliphatic polyhydric alcohol having fewer than twelve carbon atoms, and furthermore, characterized by producing a precipitate with an alkaline earth salt.

11. A process for breaking a petroleum emulsion of the water-in-oil type, which consists in subjecting the emulsion to the action of a water-soluble demulsifying agent containing a water-soluble salt of a petroleum sulfonic body derived from the condensation of a petroleum body, characterized by being capable of reaction with sulfuric acid, and an aliphatic polyhydric alcohol having fewer than twelve carbon atoms, and furthermore, characterized by producing a precipitate with an alkaline earth salt.

12. A process for breaking a petroleum emulsion of the water-in-oil type, which consists in subjecting the emulsion to the action of a water-soluble demulsifying agent containing an ammonium salt of a petroleum sulfonic body derived from the condensation of a petroleum body, characterized by being capable of reaction with sulfuric acid, and an aliphatic polyhydric alcohol having fewer than twelve carbon atoms, and furthermore, characterized by producing a precipitate with an alkaline earth salt.

13. A process for breaking a petroleum emulsion of the water-in-oil type, which consists in subjecting the emulsion to the action of a demulsifying agent containing a petroleum sulfonic body derived from the condensation of a petroleum body, characterized by being capable of reaction with sulfuric acid, and ethylene glycol, and furthermore, characterized by producing a precipitate with an alkaline earth salt.

14. A process for breaking a petroleum emulsion of the water-in-oil type, which consists in subjecting the emulsion to the action of a water-soluble demulsifying agent containing a petroleum sulfonic body derived from the condensation of a petroleum body, characterized by being capable of reaction with sulfuric acid, and ethylene glycol, and furthermore, characterized by producing a precipitate with an alkaline earth salt.

15. A process for breaking a petroleum emulsion of the water-in-oil type, which consists in subjecting the emulsion to the action of a water-soluble demulsifying agent containing a water-soluble salt of a petroleum sulfonic body derived from the condensation of a petroleum body, characterized by being capable of reaction with sulfuric acid, and ethylene glycol, and furthermore, characterized by producing a precipitate with an alkaline earth salt.

16. A process for breaking a petroleum emulsion of the water-in-oil type, which consists in subjecting the emulsion to the action of a water-soluble demulsifying agent containing an ammonium salt of a petroleum sulfonic body derived from the condensation of a petroleum body, characterized by being capable of reaction with sulfuric acid, and ethylene glycol, and furthermore, characterized by producing a precipitate with an alkaline earth salt.

MELVIN DE GROOTE.
LOUIS T. MONSON.